United States Patent
Beneteau

[15] 3,657,509
[45] Apr. 18, 1972

[54] NUT WELDING ELECTRODE

[72] Inventor: Donald Joseph Beneteau, R.R. 2, Amherstburg, Ontario, Canada

[22] Filed: Feb. 16, 1971

[21] Appl. No.: 115,217

[52] U.S. Cl. ................................................. 219/120
[51] Int. Cl. ................................................. B23k 11/30
[58] Field of Search ........................... 219/89, 119, 120

[56] References Cited

UNITED STATES PATENTS

| | | | |
|---|---|---|---|
| 2,731,535 | 1/1956 | Grey | 219/119 |
| 2,661,599 | 12/1953 | Folmer | 219/89 X |

FOREIGN PATENTS OR APPLICATIONS

| | | | |
|---|---|---|---|
| 781,096 | 8/1957 | Great Britain | 219/119 |

*Primary Examiner*—C. L. Albritton
*Attorney*—Charles Krassov

[57] ABSTRACT

A resistance welding electrode for welding nuts or other items which have apertures to parts provided with corresponding apertures, consisting of a main water-cooled body upon which os located an adaptable welding face and containing a sliding pilot pin which passes through and extend beyond the welding face. The nut or the like to be welded is palaced upon the pilot pin, and the part to which it is to be welded is located on the welding face. To weld, the pilot pin is depressed so that the nut is pressed against the part to which it is to be welded. The base of the pilot pin is equipped with a piston which slides within a compression chamber within the main body, so that when the weld is completed and the pressure on the pilot pin is released, the compressed air in the said chamber returns the pin to its normal position.

1 Claims, 1 Drawing Figure

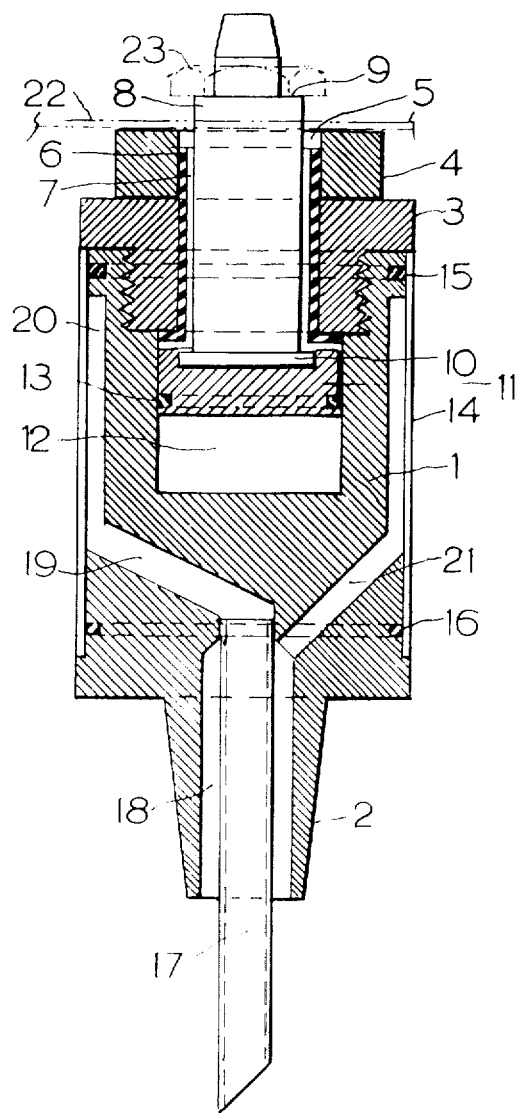

NUT WELDING ELECTRODE

This invention relates generally to resistance welding electrodes and particularly to electrodes used in welding nuts, spacers, screws, pins, etc. to sheet metal. This electrode is particularly suitable to the welding of parts to sheet metal, where such parts are to be aligned with holes drilled or punched in the sheet metal, without resorting to special jigs or fixtures for alignment.

Similar electrodes used at present are designed for use with one particular item. When a different type of attachment is required to be welded, the entire electrode has to be redesigned to fit the new condition. This makes the use of these electrodes very costly, where a variety of different items are to be welded to sheet metal. Furthermore, the particular construction of these electrodes does not lend itself to proper and efficient cooling, so that wear and deteration of the electrode takes place at a greater rate, thus requiring more frequent maintenance and replacement.

The object of this invention is to provide an electrode which can be easily and cheaply adapted to various types of items to be welded, and which provides an efficient cooling system for longer life.

Various other advantages of this invention will become apparent as it is being described in the following specification.

The main objectives are attained in the invention by providing an adapter which is detachable from the main body of the electrode and easily replaced with others as required. Furthermore, a system of grooves and slots are provided within the main body of the electrode for efficient cooling water circulation.

In describing the invention reference will be made to the attached drawing in which, The FIGURE is an enlarged view of the invention, shown mainly in section.

The main body of the invention consists of a cylindrical block 1 of suitable conductive metal. The cylinder 1 terminates in a tapered stem 2 for fitting into a standard electrode holder of a resistance welder.

At its top, the body 1 is provided with a centrally located tapped hole into which is screwed a head 3, and on top of this head is located a welding face 4. A central hole 5 is provided in the said head and welding face and is common to both. The hole 5 is lined with an insulting lining 6 which is in turn covered with a wear lining 7. The said welding face, which is usually made of a copper tungsten alloy can be made to fit any required welding conditions.

The base 10 of the pilot pin 8 rests within a piston 11 which slides in a cylinder hole 12 within the main body 1. The piston 11 is provided with an annular groove containing a rubber "O" ring 13.

The main body 1 is provided with a tubular enclosure 14, so that with the "O" rings 15 and 16, provided in the main body 1, it becomes water tight.

The water cooling system for the electrode consists of a water intake tube 17 which passes through an enlarged hole 18 in the stem 2. The water proceeds through a channel 19 in the main body 1 and circulates around the electrode in the space 20 formed between the main body 1 and the enclosure 14, the water then discharges through the drain port 21 and through the enlarged hole 18 in the stem 2. Additional rubber "O" rings similar to 15 and 16 can be provided if required for more efficient sealing of the coolant.

In operation, the perforated sheet metal 22 is placed upon the welding face 4 and the nut is placed on the shoulder 9 of the pin 8. When the pin 8 is pressed down by the resistance welder in normal operation, the nut 23 is welded in position to the sheet metal 22. To weld bolts to the sheet metal, the pin 8 is removed and the bolt is inserted in its place, then the same procedure follows.

Having described the invention what I claim is

1. A resistance welding electrode for aligning and welding a nut or similar item having an aperture to another part having a corresponding aperture comprising;
   a. An electrode having a cylindrical main body of an electrically conductive material, terminating at its bottom into a bored and tapered stem by means of which the said electrode can be attached to a welding machine; a tapped hole at the top of the body for screwing a head therein; a centrally located cylindrical chamber below the said tapped hole; intake and drain passages for a coolant making contact with the bore of the said stem; and a plurality of annular rubber "O" rings at the top and bottom of the said body to prevent coolant leakage;
   b. a threaded head which screws into the tapped hole in the said main body having a central hole therethrough;
   c. a welding face which rests upon the said head having a central hole corresponding to and lined up with the hole in the said head;
   d. an insulating lining and a wear lining on top of the insulating lining running the full length of the holes in the head and welding face;
   e. a cylindrical pilot pin provided with an enlarged annular base and a tapered pin at its top having a smaller diameter than the pilot pin in order to provide a shoulder, said pilot pin sliding within the lined holes of the head and the welding face and extending beyond the welding face;
   f. a cylindrical piston which contains the enlarged base of the pilot pin and is provided with a rubber "O" ring to provide an air tight slide within the said cylindrical chamber in the said main body;
   g. a tubular enclosure for the said main body spaced from the said body and tightly held against the "O" rings of the said main body to provide a coolant space around it, said coolant space making contact with the said intake and drain passages, and
   h. a coolant intake tube passing through the bottom of the said tapered stem and connecting with the intake passage in the main body, said tube being of a smaller diameter than the bore in the stem in order to provide a coolant discharge space through the stem.

* * * * *